(12) United States Patent
Baussaron et al.

(10) Patent No.: US 11,466,932 B2
(45) Date of Patent: Oct. 11, 2022

(54) PROCESS FOR DRYING POLYSACCHARIDES

(71) Applicant: RHODIA OPERATIONS, Paris (FR)

(72) Inventors: Loïc Baussaron, Serpaize (FR); Kraig Luczak, Cranbury, NJ (US); Paul Kirkpatrick, Old Bridge, NJ (US)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 16/649,326

(22) PCT Filed: Sep. 27, 2018

(86) PCT No.: PCT/EP2018/076364
§ 371 (c)(1),
(2) Date: Mar. 20, 2020

(87) PCT Pub. No.: WO2019/063739
PCT Pub. Date: Apr. 4, 2019

(65) Prior Publication Data
US 2020/0256618 A1    Aug. 13, 2020

Related U.S. Application Data

(60) Provisional application No. 62/564,559, filed on Sep. 28, 2017.

(51) Int. Cl.
*F26B 3/347* (2006.01)
*C08B 37/00* (2006.01)
(Continued)

(52) U.S. Cl.
CPC .......... *F26B 3/347* (2013.01); *C08B 37/0096* (2013.01); *F26B 9/06* (2013.01); *F26B 25/006* (2013.01); *F26B 5/048* (2013.01)

(58) Field of Classification Search
CPC .......... F26B 3/347; F26B 9/06; F26B 25/006; F26B 5/048; F26B 39/006; C08B 37/0096
(Continued)

(56) References Cited

U.S. PATENT DOCUMENTS 4,341,803 A * 7/1982 Koshida ............... A23B 7/01
34/284
5,558,899 A * 9/1996 Kuzee .................. A21D 2/181
426/237
(Continued)

FOREIGN PATENT DOCUMENTS

CN      1887895 A      1/2007
DE      19712708 A1    10/1998
(Continued)

OTHER PUBLICATIONS

Cezar A. Bizzi; Juliano S. Barin; Aline L. Hermes; Sergio R. Mortari; Érico M. M. Flores—A fast microwave-assisted procedure for loss on drying determination in saccharides—Journal of the Brazilian Chemical Society (2011) vol. 22, No. 2—DOI: 10.1590/S0103-50532011000200026.
(Continued)

*Primary Examiner* — Stephen M Gravini
(74) *Attorney, Agent, or Firm* — Osha Bergman Watanabe & Burton LLP

(57) ABSTRACT

The present invention is directed to a process for drying a material comprising at least one polysaccharide, said process comprising a step wherein the material is submitted to microwave irradiations under conditions which do not degrade said polysaccharide.

17 Claims, 2 Drawing Sheets

(51) Int. Cl.
*F26B 9/06* (2006.01)
*F26B 25/00* (2006.01)
*F26B 5/04* (2006.01)

(58) Field of Classification Search
USPC .......................................................... 34/255
See application file for complete search history.

(56) References Cited

U.S. PATENT DOCUMENTS

| | | | |
|---|---|---|---|
| 7,700,764 B2* | 4/2010 | Heijnesson-Hulten | ..................... C08B 15/02 536/56 |
| 8,030,030 B2* | 10/2011 | Varanasi | ................. C12P 19/14 435/72 |
| 9,447,198 B2* | 9/2016 | Zhang | ..................... C08H 8/00 |
| 10,086,032 B2* | 10/2018 | Cheng | ................... A61K 36/82 |
| 10,835,552 B2* | 11/2020 | Wang | ................... A23L 33/125 |
| 10,844,141 B2* | 11/2020 | Araujo Rodrigues Muchiutti ...... C08B 37/006 |
| 2008/0260805 A1 | 10/2008 | Yang et al. | |
| 2010/0224756 A1* | 9/2010 | Muller | ..................... B22C 1/26 249/117 |
| 2020/0256618 A1* | 8/2020 | Baussaron | ................ F26B 9/06 |

FOREIGN PATENT DOCUMENTS

| | | | | |
|---|---|---|---|---|
| EP | 0375126 | A1 | 6/1990 | |
| EP | 0686643 | A1 | 12/1995 | |
| EP | 0943627 | A1 | 9/1999 | |
| EP | 2303928 | B1 * | 3/2019 | ......... C08B 37/0024 |
| FR | 2932803 | B1 * | 4/2012 | .......... C08B 37/006 |
| WO | 03062438 | A1 | 7/2003 | |
| WO | 2008058769 | A1 | 5/2008 | |
| WO | WO-2009152595 | A1 * | 12/2009 | ......... C08B 37/0057 |
| WO | WO-2019063739 | A1 * | 4/2019 | ............... A23L 3/54 |

OTHER PUBLICATIONS

T.Thimma Reddy, Shekharam Tammishetti—Free radical degradation of guar gum—Polymer Degradation and Stability (2004) vol. 86, Issue 3, pp. 455-459—DOI: 10.1016/j.polymdegradstab.2004. 05.017.

Amrutlal L. Prajapat, Parag R. Gogate—Depolymerization of guar gum solution using different approaches based on ultrasound and microwave irradiations—Chemical Engineering and Processing: Process Intensification (2015) vol. 88, pp. 1-9—DOI: 10.1016/j. cep.2014.11.018.

"Singh V, Tiwari A—Hydrolytic fragmentation of seed gums under microwave irradiation—Int J Biol Macromol. (2009) vol. 44, Issue 2, pp. 186-189. DOI: 10.1016/j.ijbiomac.2008.12.003".

Office Action issued in a counterpart European Application No. 18779650.3, dated Dec. 20, 2021 (6 pages).

* cited by examiner

PROCESS FOR DRYING POLYSACCHARIDES

RELATED APPLICATION

This application is a U.S. national phase entry under 35 U.S.C. § 371 of International Application No. PCT/EP2018/076364, filed on Sep. 27, 2018, which claims priority to U.S. provisional application U.S. 62/564,559 filed on Sep. 28, 2017. The entire contents of these applications are explicitly incorporated herein by this reference.

TECHNICAL FIELD

The present invention relates to a process for drying polysaccharides.

BACKGROUND ART

Natural polysaccharides from different sources have long been studied and widely used in different areas, such as food and feed, medicine and pharmaceutics, oil and gas industry and in papermaking. In recent decades, there has been an increased interest in the utilization of polysaccharides, particularly bioactive ones, for various novel applications owing to their biocompatibility, biodegradability, non-toxicity, and some specific therapeutic activities. These naturally occurring polysaccharides may be chemically modified for specific purposes.

An example of such natural polysaccharide is guar gum which has a high molecular weight and is made of galactose and mannose (a galactomannan). Guar derivatives, such as cationic and anionic derivatives, are widely used as value-added thickening agents in various industries including food, personal care, agriculture, oil and gas industries.

Natural and modified polysaccharides are most often commercially available in the form of a powder. Thus, commonly, a final drying step is carried out for removing solvents used during the reaction and/or the washing steps involved in their manufacturing process.

Conventional drying methods, which allow removing water and/or other organic solvents from a material, generally comprise a step of heating a material, which is therefore a surface heating which necessitates very long times since the heating cannot be performed at a high temperature in order to prevent degradation of the material to be dried and the drying process can therefore be very long. For drying materials being sensitive to degradation, the traditional industrial methods need to be implemented very cautiously and may be very long, for example they may last 12 hours or more.

It was thus an object of the present invention to develop a process which is suitable for drying a material comprising polysaccharides, which is more efficient than the conventional drying methods and which does not degrade the physical and chemical properties of the polysaccharides.

SUMMARY OF THE INVENTION

A first object of the invention is a process for drying a material comprising at least one polysaccharide, said process comprising a step wherein the material is submitted to microwave irradiations under conditions which do not degrade said polysaccharide.

According to an embodiment of the invention, the material comprises, before being submitted to microwave irradiations, at least 20% by weight, preferably at least 30% by weight, more preferably at least 40% by weight of the at least one polysaccharide, based on the total weight of the material.

According to an embodiment, the material further comprises, before being submitted to microwave irradiations, at least one solvent.

Preferably, the at least one solvent is selected from solvents characterized by a tan δ of higher than 0.1, preferably higher than or equal to 0.3, more preferably higher than or equal to 0.4, measured at 2450 MHz at 25° C.

Preferably, the at least one solvent is selected from water, alcohols, organosulfur solvents, organohalogenated solvents, carboxylic acids, and apolar amine solvents.

According to an embodiment, the material comprises, before being submitted to microwave irradiations, from 5 to 80% by weight, preferably from 10 to 70% by weight, more preferably from 20 to 60% by weight, even more preferably from 30 to 50% by weight, of at least one solvent, based on the total weight of the material.

According to an embodiment, the microwave power density received by the material ranges from 0.001 to 10 kW/kg, preferably from 0.005 to 1 kW/kg, even more preferably from 0.01 to 0.3 kW/kg.

According to an embodiment, the process is performed with a reduced pressure preferably with a pressure ranging from 1 mbar to 500 mbar, preferably from 5 mbar to 200 mbar, more preferably from 10 mbar to 100 mbar.

According to an embodiment, the process is performed at a temperature ranging from −10° C. to 100° C., preferably from 0° C. to 80° C., more preferably from 10 to 70° C.

According to an embodiment, the polysaccharide is selected from guar gum, nonionic guar derivatives, amphoteric guar derivatives, cationic guar derivatives, anionic guar derivatives and any combination thereof.

Preferably, the polysaccharide is selected from cationic guar derivatives and anionic guar derivatives.

According to an embodiment, the polysaccharide has a number-average molecular weight greater than or equal to 50,000 g/mol, preferably ranging from 50,000 g/mol to 3,000,000 g/mol, more preferably ranging from 250,000 g/mol to 2,500,000 g/mol.

According to an embodiment, the polysaccharide has a weight-average molecular weight greater than or equal to 50,000 g/mol, preferably ranging from 50,000 g/mol to 3,000,000 g/mol, more preferably ranging from 250,000 g/mol to 2,500,000 g/mol.

The process of the present invention can be performed on materials having a low degradation temperature, for example a degradation temperature lower than 100° C. or even lower than 80° C. or lower than 70° C. In particular, the process of the invention is not harmful for the treated materials, i.e. the materials and in particular the polysaccharides keep their properties since they are not deteriorated by the drying process of the invention. In other words, the process of the invention is a non-destructive drying process for polysaccharides.

The process of the present invention is more efficient than prior art processes since said process may be performed in a shorter time, therefore the productivity of the process is improved.

The process of the invention allows the energy consumption to be reduced since it may be performed with a reduced time.

The process of the invention is performed more rapidly than prior art drying methods for polysaccharide compounds and does not modify the physical and chemical properties of said compounds.

DETAILED DESCRIPTION OF THE INVENTION

Figure 1:
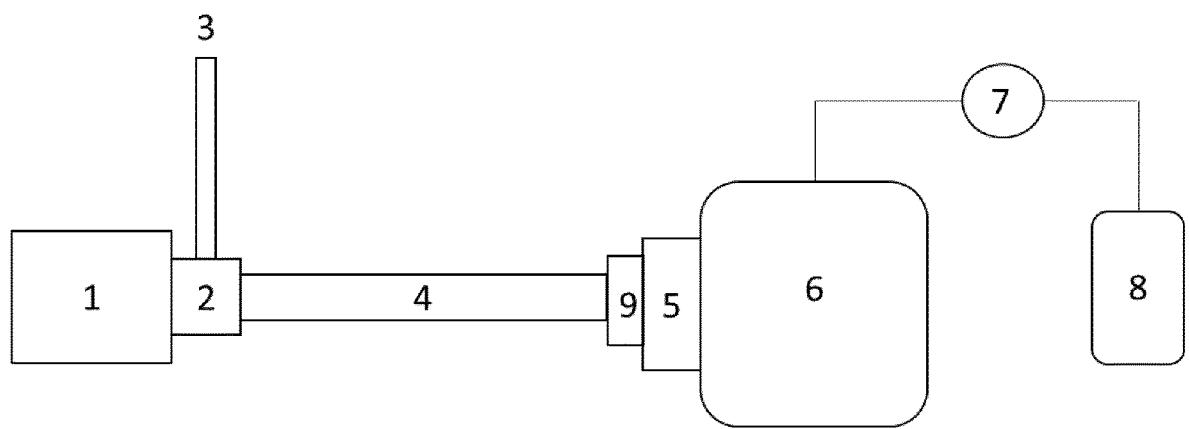
FIG. 1 schematically represents an apparatus suitable for implementing the process of the invention.

The present invention is directed to a process for drying a material A comprising at least one polysaccharide B, said process comprising a step wherein the material is submitted to microwave irradiations under conditions which do not degrade said polysaccharide.

By the expression "drying a material A", it is to be understood that during the process, compounds, such as solvents or possibly other impurities are removed by evaporation from the material A, in order to increase the proportion of the polysaccharide(s) B in the material A.

By the expression "conditions which do not degrade the polysaccharides", it is to be understood that during the drying step, the applied conditions, such as temperature and pressure, are such that the polysaccharide is not depolymerized or otherwise structurally modified.

According to an embodiment of the invention, the material A comprises initially (i.e. before treatment by microwave irradiations) at least 20% by weight, preferably at least 30% by weight, more preferably at least 40% by weight of at least one polysaccharide B, based on the total weight of the material.

The material A may further comprise compounds, different from the polysaccharide(s) B of interest which may be impurities originating for example from the process for producing the polysaccharide B or residual solvents used during said process, for example during a final step of washing of the polysaccharide B. Among impurities, mention may be made of proteins, saccharides, and reactants used for producing the polysaccharide B, such as functionalization agents.

Other impurities that can be present in material A are by-products obtained from the synthesis of polysaccharide B. They may represent up to around 1% by weight of the total weight of the dried material (i.e. the material obtained at the end of the process of the invention).

According to an embodiment, the compounds represent from 5 to 80% by weight, preferably from 10 to 70% by weight, more preferably from 20 to 60% by weight, even more preferably from 30 to 50% by weight of the total weight of the initial material A (i.e. the material A before treatment by microwave irradiations).

According to an embodiment of the invention, the material A comprises at least one solvent.

The solvent is preferably selected from solvents characterized by a tan δ (dielectric dissipation factor) of higher than 0.1, preferably higher than or equal to 0.3, more preferably higher than or equal to 0.4, measured at 2450 MHz at 25° C. D. Bogdal, *Microwave assisted organic synthesis*, Elsevier 2005, gives values for tan δ. As it is well known for the skilled person:

tan δ=ε"/ε' wherein:

ε" represents the dielectric loss;

ε' represents the dielectric constant.

Among suitable solvents, mention may be made of alcohols, water, organosulfur solvents, organohalogenated solvents, carboxylic acids, and apolar amine solvents. For example, mention may be made to chlorobenzene, water, 1,2-dichloroethane, dimethylformamide, acetic acid, N-methyl-2-pyrrolidone, o-dichlorobenzene, 2-methyoxyethanol, 2-butanol, isobutanol, 1-butanol, nitrobenzene, methanol, formic acid, 1-propanol, 2-propanol, DMSO, ethanol and ethylene glycol.

Preferably, the solvent is selected from water, alcohols, in particular having from 1 to 12 carbon atoms or from 1 to 6 carbon atoms, and mixture thereof, and more preferably from water, methanol, isopropanol and mixtures thereof.

Preferably, the solvent(s) if present represents from 5 to 80% by weight, preferably from 10 to 70% by weight, more preferably from 20 to 60% by weight, even more preferably from 30 to 50% by weight of the total weight of the initial material A (i.e. the material A before treatment by microwave irradiations).

According to an embodiment, the polysaccharide B is selected from guar gum and derivatives thereof, such as cationic guar derivatives, anionic guar derivatives, nonionic guar derivatives, amphoteric guar derivatives, and any combination thereof.

Preferably, the polysaccharide B is selected from guar derivatives, such as non-ionic guar derivatives, anionic guar derivatives and cationic guar derivatives. The anionic guar derivatives may be carboxymethyl guar. The cationic guar derivatives may be guar hydroxypropyltrimonium chloride, non-ionic guar derivatives may be hydroxypropyl guar, and combination of these guars for example would be carboxymethyl hydroxypropyl guar, and combinations thereof.

Processes of manufacturing guar derivatives are well known to the person skilled in the art. In particular, documents WO2008/058769, EP0686643, EP0943627 and EP0375126 describe processes of manufacturing guar derivatives.

According to an embodiment, the polysaccharide B has a number-average molecular weight greater than or equal to 50,000 g/mol, preferably ranging from 50,000 g/mol to 3,000,000 g/mol, more preferably ranging from 250,000 g/mol to 2,500,000 g/mol.

According to an embodiment, the polysaccharide B has a weight-average molecular weight greater than or equal to 50,000 g/mol, preferably ranging from 50,000 g/mol to 3,000,000 g/mol, more preferably ranging from 250,000 g/mol to 2,500,000 g/mol.

According to an embodiment, the polysaccharide B has a polydispersity index greater than or equal to 1.0, preferably ranging from 1.0 to 5.

The material A may be in the form of a slurry, a solid, a solution or an emulsion, preferably in the form of a slurry. Such a slurry or a solid can thus be in the form of a powder impregnated by liquids resulting from the process of production thereof.

The material A is submitted to microwave irradiations which allow drying of said material. Therefore, during the process of the invention, liquids which may be present in the material A are removed from the material A, generally by evaporation of these liquids.

Microwave irradiations are a form of electromagnetic irradiation with wavelengths ranging from one meter to one millimeter, with frequencies ranging from 300 MHz to 300 GHz. Microwave sources or generators suitable for implementing the process of the invention are well known for the skilled person and among them, mention may be made of the magnetron, the gyrotron and the klystron.

Microwave apparatus suitable for implementing the process of the invention are commercially available and known for the skilled person. As a matter of example, such apparatus are available from Sairem, Cober or Püschner Companies.

According to an embodiment of the process, the microwave power density received by the material A during the process ranges from 0.001 to 10 kW/kg, preferably from 0.005 to 1 kW/kg, even more preferably from 0.01 to 0.3 kW/kg. The power density refers to the power in W received per kg of material A to be dried (initial).

According to an embodiment of the process, the microwave frequencies sent by a microwave source range from 800 MHz to 6000 MHz. Preferably, the frequency used is selected from the frequencies approved for industrial applications (such as medical, domestic or scientific applications), for example the frequency may be ranged from 875 MHz to 950 MHz or from 2400 MHz to 2500 MHz or also from 5725 MHz to 5875 MHz. For an industrial scale, a frequency ranging from 875 MHz to 950 MHz, such as 915 MHz, will be preferred for a greater energetic efficiency.

The "power received by the material" within the meaning of the present invention, is the power effectively received and which reaches the material A. Indeed, the power received by the material may be different from the power emitted by the microwave source because of absorption phenomenon through the installation (walls of drum for example) and/or losses (reflected power), between the source and the material to be dried.

Preferably, the microwave irradiations work in multimode, which allows irradiating all the volume of the cavity containing the material A, which allows increasing the homogeneity of the irradiation of the material A. According to this embodiment in multimode, the size of the cavity containing the material A is greater than the wavelength of the irradiation.

The process may be a continuous process or a batch process, preferably a batch process. For instance, in a continuous process, product is installed on a belt dryer assisted by microwave. In a batch process, at the end of the drying, the microwave irradiations are stopped. The end of the drying may be evaluated by measuring the amount of the polysaccharide B and/or by measuring the amount of the liquid(s), generally of the solvent(s), in the product obtained. Those measurements can be made with methods well known for the skilled person, such as moisture analyzer.

FIG. 1 schematically illustrates an example of an apparatus suitable for implementing the process of the invention. The apparatus illustrated in FIG. 1 comprises a microwave generator 1. A circulator 2 controls the direction of the incident wave and transfers the reflected energy to a measuring antenna 3, which allows quantifying the energy absorbed by the medium and thus the energetic efficiency. A waveguide 4 transports the microwave from the generator 1 to the cavity 6. A structure 5 which does not absorb the microwaves and which is resistant to the vacuum can also be present between the waveguide 4 and the cavity 6. The structure 5 is designed in order that all the system is adapted in impedance. The cavity 6 comprises the material A to be dried and may be put under vacuum during the process for drying. The cavity 6 may be provided with a stirrer dedicated to powder management, not represented in FIG. 1. An element 9 can adjust the impedance of the apparatus during the drying process (for example a 3stub). A vacuum pump may also be present (not represented in FIG. 1).

The apparatus may also comprise a condenser 7 used to condense the evaporated liquids that are removed from the material A during the process. A container 8 may recover the liquids, such as the solvents, that are condensed in the condenser 7.

According to an embodiment, the process is performed with a reduced pressure generally in a closed system, preferably a cavity, preferably with a pressure ranging from 1 mbar (100 Pa) to 500 mbar (50000 Pa), preferably from 5 mbar (500 Pa) to 200 mbar (20000 Pa), more preferably from 10 mbar (1000 Pa) to 100 mbar (10000 Pa).

The microwave irradiations may be sent by a source placed outside the closed system under vacuum comprising the material. In such a case, the wall of the closed system can absorb a part of the power transmitted by the microwave source. After the drying, in order to increase the pressure in the system, an inert gas, such as nitrogen, may be introduced.

According to an embodiment, the process is performed at a temperature ranging from −10° C. to 100° C., preferably at a temperature ranging from 0° C. to 80° C., more preferably from 10 to 70° C. The temperature is most preferably less than the degradation temperature of the polysaccharide B to be dried. The possible degradation of polysaccharide B may be assessed by comparing the number-average molecular weight and/or the weight-average molecular weight of polysaccharide B before and after implementing the drying process of the invention. If the initial and final number-average molecular weight and/or the weight-average molecular weight of polysaccharide B are identical or substantially identical, it can be concluded that no degradation of polysaccharide B has occurred.

It is possible to cool or heat the microwave cavity for example by a double jacket device around the microwave cavity, if the temperature of the microwave cavity increases in a too significant manner due to the microwave irradiation and/or to an optional stiffing, for example if the temperature is higher than 60° C. or higher than 55° C.

The drying time may notably depend on the amount of material. For example the drying time may be of about 20 minutes to 3 hours for 1 kg of material.

The choice of the temperature, of the pressure and of the power will also allow modulation of the drying time.

According to an embodiment of the invention, in order to improve the homogeneity of the treatment, the material is in motion during the process, for example the movement can be a rotation or an oscillation.

When the material is in rotation, the rotation speed can range from 1 to 100 rpm, preferably from 1 to 40 rpm, more preferably from 1 rpm to 20 rpm. According to said embodiment, the material may be placed in a turntable within a microwave cavity.

When the material is in oscillation, the oscillation may be characterized by 10 to 30 oscillations per minute. According to said embodiment, the material may be placed in a closed system (such as a cylinder) and said closed system is put in oscillation, and the microwave irradiations are received through said closed system.

According to an embodiment, the material A is in motion in the cavity. The cavity comprising the material A may be provided by stiffing means in order to stir the material A and increase the homogeneity of the irradiation through the material A.

During the process of the invention, solvents are removed. The proportion of solvent(s) in the material A at the end of the process of the invention is lower than the proportion of solvent(s) in the material A before start of the process of the invention.

According to an embodiment, after the drying process, the total amount of solvent(s) is less than 15% by weight, preferably less than 10% by weight, more preferably less than 5% by weight, based on the total weight of the material at the end of the process.

During the process of the invention, impurities other than solvents, such as the reactants, for example functionalization agents, by-products, or catalysts used to prepare the polysaccharide B, may also be removed.

The proportion of polysaccharide(s) B in the material A at the end of the process of the invention is higher than the proportion of polysaccharide(s) B in the material A before beginning of the process of the invention.

According to an embodiment, after the drying process, the total amount of polysaccharide(s) B is higher than or equal to 85% by weight, preferably higher than or equal to 90% by weight, more preferably higher than or equal to 95% by weight, based on the total weight of the material at the end of the process.

The inventors surprisingly found that materials containing polysaccharides can be efficiently dried with microwave irradiations since for example the average drying time for removing solvents from the material with the claimed process is reduced by a factor of 50 as compared to a conventional heating method. In particular, it has been observed that a polysaccharide does not absorb or absorb little microwave irradiations whereas the solvent(s) (or other impurities), in particular the solvents used to prepare and/or wash the polysaccharide, absorb a lot microwave irradiation. The drying process of the invention is selective and does not alter the properties of polysaccharide B which can be used as an active ingredient in formulations and doing reaction/chemistry.

It should be noted that prior art has disclosed processes in which microwaves are applied on polysaccharides, but for a totally different purpose, namely the decomposition of the polysaccharides into oligosaccharides, which is at odds with the present invention.

Should the disclosure of any patents, patent applications, and publications which are incorporated herein by reference conflict with the description of the present application to the extent that it may render a term unclear, the present description shall take precedence.

The following examples show the effectiveness of the process and further explain the process of the present invention.

EXAMPLES a) Preparation of a starting material AX

The material AX comprising a cationic guar derivative (carboxymethyl hydroxymethyl type) may be prepared according to the following process.

Isopropyl alcohol (IPA; 210 g, 85%), guar (100 g) and borax (0.7 g) are charged in a reactor equipped with mechanical stiffing. Then, water (85 g) is charged to the reactor and the reactor content is mixed for 5 minutes. A sodium monochloroacetate solution (46 g, 30%) is charged and the reactor content is mixed for 20 minutes. Finally, NaOH (46 g, 50%) is charged and mixing is performed for another 10 minutes.

The vessel is sealed and 3 evacuations alternating between charging nitrogen and pulling vacuum on the system are performed. On the final evacuation, vacuum is pulled and the system is isolated under vacuum. Propylene oxide (30 g) is charged to the reactor and mixing is performed for 5 minutes after addition. The reaction medium is heated to 60° C.-80° C. for 90 minutes. The reaction medium is then cooled to 35° C. while purging the reactor 5 times with nitrogen. The reaction medium is neutralized with HCl (25 g, 15%) and mixed for 5 minutes. Additional IPA (105 g, 85%) is charged to the reactor and mixed for 15 minutes. Contents are discharged from the reactor and filtration is performed for collecting the powder. The powder is suspended in water and IPA (225 g, 60%). The resulting suspension is mixed for 30 minutes and then filtered. Suspension and filtration are repeated two times. The remaining powder is collected and dried overnight in an oven at 50-60° C.

b) Preparation of a starting material AY

The material AY comprising a cationic guar derivative (hydroxypropyl type) may be prepared according to the following process.

JAGUAR® 8060 flour, a hydroxypropyl guar manufactured by Rhone-Poulenc Inc. (200 g) are added to 1000 ml of an 85% IPA solution. The reaction is stirred for a few minutes and is neutralized with concentrated HCl or glacial acetic acid to a value of 7. Thereafter, 2,3-epoxypropyl-N,N,N-trimethylammonium chloride (100 g) are added over a 15 minute period and the mixture is stirred for an additional 15 minutes. 50 ml of a 50% NaOH solution are added over a 15 minute period and the mixture is stirred for an additional 15 minutes. Thereafter, the mixture is heated to 65° C. and is held at 65° C. for three hours. The mixture is cooled to about room temperature and is neutralized to a pH of about 7 by the addition of glacial acetic acid or HCl. The mixture is filtered and the filtered solids are washed successively with one liter of 50% IPA aqueous solution, one liter of 85% IPA aqueous solution, one liter of 100% isopropyl alcohol and one liter of acetone. The solids are then dried in a fluidized bed drier at about 60° C. for about one hour.

c) Drying process of the materials AX and AY

The system used in the examples in order to compare a drying process of the prior art and a drying process of the invention is a planetary mixer which has been provided with a microwave device capable of emitting and controlling the wave from the source until the cavity containing the material to be dried. The frequency of the microwave source used in the examples is 2450 MHz. For each test, the material is stirred with a rate of 20 rpm.

A comparative drying process (Comp.1AX and 1AY) has been performed without microwave irradiations using a double jacket heating of the cavity containing the material to be dried and two drying processes according to the invention (Inv.1AX; Inv.2AX and Inv.2AY) have been performed with microwave irradiations. Inv.1AX test has been performed with microwave irradiations and without a double jacket heating of the cavity containing the material AX; Inv.2AX and Inv.2AY tests have been performed with microwave irradiations and with a double jacket heating of the cavity containing the material AX (Inv.2AX) or the material AY (Inv.2AY), respectively.

The features of the processes are described in tables 1 and 2 below.

TABLE 1 features of the drying processes and of the material AX to be dried

| | Comp.1AX | Inv.1AX | Inv.2AX |
|---|---|---|---|
| material AX weight (kg) | 7.2 | 7.2 | 7.2 |
| initial moisture (60% IPA/40% water) (%) | 65 | 65 | 68 |

TABLE 1-continued features of the drying processes and of the material AX to be dried

|  | Comp.1AX | Inv.1AX | Inv.2AX |
|---|---|---|---|
| emitted microwave power (W) | 0 | 1000 | 1000 |
| double jacket temperature (° C.) | 70 | — | 70 |
| double jacket flowrate (l/h) | 2200 | — | 2200 |
| power density received (kW/kg) | 0 | 0.13 | 0.13 |
| maximal temperature (° C.) | 58 | 38 | 58 |
| pressure (mbar) | 20 | 25 | 24 |
| mean reflected power (W) | 0 | <100 | <100 |

TABLE 2 features of the drying processes and of the material AY to be dried

|  | Comp.1AY | Inv.2AY |
|---|---|---|
| material AY weight (kg) | 2467 | 9.4 |
| initial moisture (80% IPA/20% water) (%) | 65.7 | 66.6 |
| emitted microwave power (W) | 0 | 1000 |
| double jacket temperature (° C.) | 58 | 60 |
| double jacket flowrate (l/h) | 17000 | 2200 |
| power density received (kW/kg) | 0 | 0.1 |
| maximal temperature (° C.) | 43.5 | 52 |
| pressure (mbar) | 91 | 30 |
| mean reflected power (W) | 0 | <100 |

In tables 1 and 2:

Both the initial moisture and the final moisture have been measured in the materials (wet and dried states) by moisture analyzer (thermobalance) by quantifying the solvents, mainly isopropanol and water.

The pressures correspond to the pressures set during the drying process. The pressure has been slightly modified during the process in a non-significant manner.

The maximal temperature corresponds to the highest temperature measured during the process, for example using an infra-red sensor.

The mean reflected power corresponds to the microwave power reflected by the system and which will not reach the materials AX and AY.

The power density received is the power density received by the materials AX and AY and has been calculated thanks to the microwave power emitted, the mean reflected power and the weight of the materials AX and AY.

The results of the processes are described in tables 3 and 4 below.

TABLE 3

Results of the drying process of the material AX

|  | Comp.1AX | Inv.1AX | Inv.2AX |
|---|---|---|---|
| treatment time (min) | 280 | 160 | 95 |
| final moisture (%) | 9.8 | 9.8 | 10.5 |
| Mn (g/mol) | $1.82 \times 10^6$ | $1.75 \times 10^6$ | $1.83 \times 10^6$ |
| Mw (g/mol) | $2.90 \times 10^6$ | $2.88 \times 10^6$ | $2.97 \times 10^6$ |

TABLE 4

Results of the drying process of the material AY

|  | Comp.1AY | Inv.2AY |
|---|---|---|
| treatment time (min) | 470 | 84 |
| final moisture (%) | 9 | 7.5 |
| Mn (g/mol) | $1.42 \times 10^6$ | $1.44 \times 10^6$ |
| Mw (g/mol) | $2.09 \times 10^6$ | $2.13 \times 10^6$ |

Mn and Mw are the number-average molecular weight and the weight-average molecular weight of cationic guar derivatives contained in materials AX and AY after completion of the drying process, and are measured by MS chromatography.

The amount of final moisture in the final material are measured by moisture analyzer in the dried material obtained at the end of the process and is expressed in percent by weight.

In tables 3 and 4, it can be observed that Inv.1AX and Inv.2AY tests using a drying process according to the invention leads to a dried material having an amount of final moisture of less than 10% by weight, equivalent to that of Comp.1AX and Comp.1AY tests, respectively, using a drying process of the prior art (heating under vacuum). However, the treatment times of Comp.1AX and Comp.1AY tests are much higher than the treatment times of Inv.1AX, Inv.2AX and Inv.2AY tests.

In tables 3 and 4, it can also be observed that Inv.1AX, Inv.2AX and Inv.2AY tests lead to a dried material having an amount of final moisture of about 9.8%, 10.5% and 7.5% respectively, values which are currently accepted.

We can also observe that the drying process of the invention with an additional heating (Inv.2AX) is more rapid than the drying process of the invention without the double jacket heating (Inv.1AX).

Furthermore, it can be observed that Mn and Mw of the guar derivatives in Inv.1AX, Inv.2AX and Inv.2AY tests are substantially the same as Mn and Mw of the guar derivatives in Comp.1AX and Comp.1AY tests, respectively. Considering the fact that the drying process of Comp.1AX and Comp.1AY tests is known to be non-destructive of the guar gum, this demonstrates that the drying process according to the invention does not either induce degradation and/or structural modifications of the guar derivatives. In other words, the process of the invention is a non-destructive drying process for polysaccharides.

Figure 2:
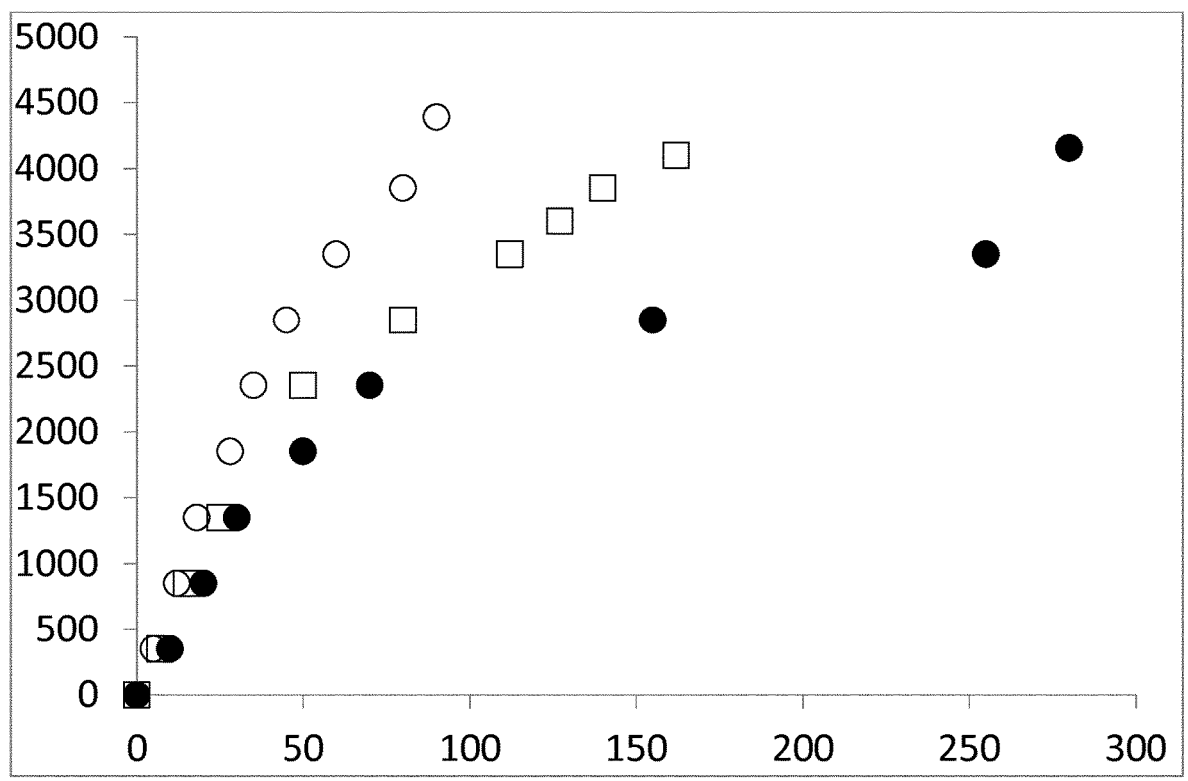
FIG. 2 represents a graph wherein the volume of recovered condensates in milliliters in function of the treatment time in minutes is illustrated for three different drying processes.

In FIG. 2, the volume of the recovered condensates in milliliters in function of the treatment time in minutes is represented.

In FIG. 2, it can be observed that the volume of the recovered condensates increases more rapidly with a drying process using microwave irradiations (Inv.1AX represented by □ and Inv.2AX represented by ○) than with a drying process without microwave irradiations (Comp.1AX represented by ●). Therefore, the drying process according to the invention is performed more rapidly than a drying process of the prior art.

The invention claimed is:

1. A process for drying a material comprising at least one polysaccharide, said process comprising a step wherein the material is submitted to microwave irradiations with a reduced pressure ranging from 1 mbar to 500 mbar under conditions which do not degrade said polysaccharide, wherein the polysaccharide is selected from the group consisting of guar gum, nonionic guar derivatives, amphoteric guar derivatives, cationic guar derivatives, anionic guar derivatives and any combination thereof.

2. The process according to claim 1, wherein the material comprises, before being submitted to microwave irradiations, at least 20% by weight of the at least one polysaccharide, based on a total weight of the material.

3. The process according to claim 1, wherein the material further comprises, before being submitted to microwave irradiations, at least one solvent.

4. The process according to claim 3, wherein the at least one solvent is selected from solvents characterized by tan δ of higher than 0.1, measured at 2450 MHz at 25° C.

5. The process according to claim 3, wherein the at least one solvent is selected from water, alcohols, organosulfur solvents, organohalogenated solvents, carboxylic acids, and apolar amine solvents.

6. The process according to claim 3, wherein the material comprises, before being submitted to microwave irradiations, from 5 to 80% by weight of the at least one solvent, based on a total weight of the material.

7. The process according to claim 1, wherein a microwave power density received by the material ranges from 0.001 to 10 kW/kg.

8. The process according to claim 1, wherein the process is performed at a temperature ranging from −10° C. to 100° C.

9. The process according to claim 1, wherein guar derivatives are selected from cationic guar derivatives and anionic guar derivatives.

10. The process according to claim 1, wherein the polysaccharide has a number-average molecular weight greater than or equal to 50,000 g/mol.

11. The process according to claim 1, wherein the polysaccharide has a weight-average molecular weight greater than or equal to 50,000 g/mol.

12. The process according to claim 2, wherein the material comprises, before being submitted to microwave irradiations, at least 30% by weight of the at least one polysaccharide, based on the total weight of the material.

13. The process according to claim 4, wherein the at least one solvent is selected from solvents characterized by a tan δ of higher than or equal to 0.3, measured at 2450 MHz at 25° C.

14. The process according to claim 6, wherein the material comprises, before being submitted to microwave irradiations, from 10 to 70% by weight of the at least one solvent, based on the total weight of the material.

15. The process according to 7, wherein the microwave power density received by the material ranges from 0.005 to 1 kW/kg.

16. The process according to claim 8, wherein the process is performed at a temperature ranging from 0° C. to 80° C.

17. The process according to claim 10, wherein the polysaccharide has a number-average molecular weight ranging from 50,000 g/mol to 3,000,000 g/mol.

* * * * *